Figure 1:
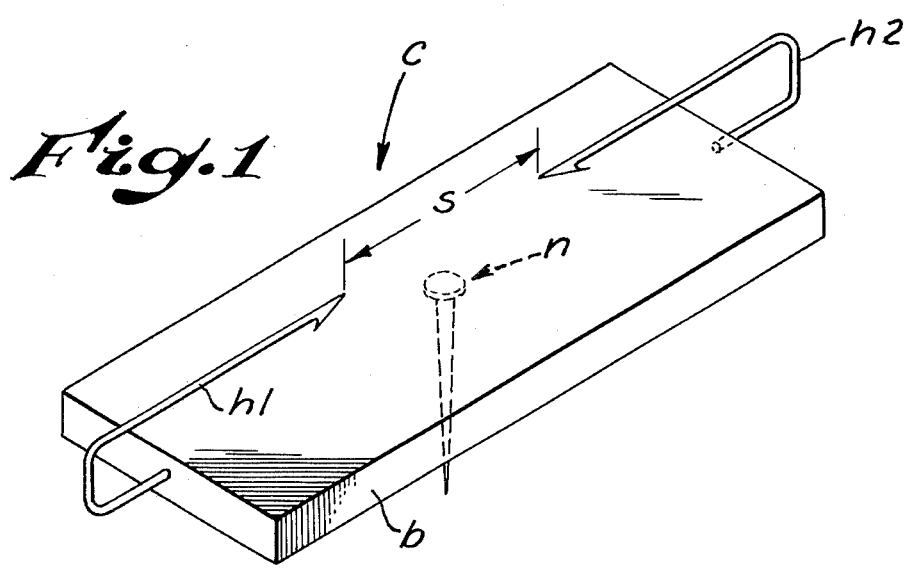

United States Patent [19]

Clark

[11] 4,179,836
[45] Dec. 25, 1979

[54] MOLE CATCHER
[75] Inventor: Herbert J. Clark, Midland, Mich.
[73] Assignee: Thresher Institutes, Incorporated, Midland, Mich.
[21] Appl. No.: 824,946
[22] Filed: Aug. 15, 1977

Related U.S. Application Data

[63] Continuation of Ser. No. 623,830, Oct. 20, 1975, abandoned.

[51] Int. Cl.² ............................................. A01M 23/30
[52] U.S. Cl. ........................................................ 43/77
[58] Field of Search ................................ 43/77, 79, 80

[56] References Cited

U.S. PATENT DOCUMENTS

| | | | |
|---|---|---|---|
| 473,872 | 4/1892 | Gillpatrick | 43/77 |
| 605,890 | 6/1898 | Merritt | 43/77 |
| 926,275 | 6/1909 | Merritt | 43/77 |
| 1,068,400 | 7/1913 | Hodge | 43/77 |

Primary Examiner—James L. Jones, Jr.
Attorney, Agent, or Firm—N. Jerome Rudy

[57] ABSTRACT

An efficient mole catcher is comprised of a pair of hooks with sharp ends that are advantageously barbed and which are placed upright in or on both ends of a board of like base so as to be adapted to catch a mole or the like varmint due to the moving along of the mole its runway so as to go over the first hook without notice; then bump into and get jabbed by the point of the second hook which it runs into causing it to sharply back up and get firmly stuck on the other lead hook then behind him which thus leaves the varmint fixed and snagged to be trapped there to sooner or later die and/or rot in its hole.

1 Claim, 4 Drawing Figures

MOLE CATCHER

HISTORY OF THE APPLICATION

This Application is a Continuation of the herewith abandoned Application for United States Letters Patent having Ser. No. 623,830 which was filed Oct. 20, 1975 now abandoned.

BACKGROUND OF THE INVENTION

Moles are real pests which do a lot of damage to all kinds of property. Much time and money (not to mention concern) is expended trying to get rid of them. Heretofore, the known devices have not been too effective in getting rid of moles and like or equivalent varmints on an easy and good basis. To illustrate this: (1) water flooding of the mole hole usually doesn't work; (2) digging is tedious, hard, spoils more of the ground and is only occasionally successful; (3) most known traps are expensive and difficult to work and use and are not always satisfactory since, in fact, they are not always satisfactorily operable; and (4) poisons have to, in any case, be used with great caution and are becoming disfavorable not only because of their being worrisome when children and/or pets are around, etc., but due to growing problems involving their use for ecological and safety reasons.

FIELD AND OBJECTIVES OF THE INVENTION

The present invention involves a new, simple and very cheap mole catcher which works very effectively and snags moles precisely in their burrows to give reliable good results without any particular fuss about it; and provides a neat and almost foolproof way of catching moles without undue effort. It thus pertains to a new mole catcher contrivance and the manner of using it; which are amongst the principal objects of the invention.

With the present mole catcher, as is readily apparent from its construction and manner of use, a person need not resort to fancy and costly traps that seem to fail too much and often nor dangerous and unliked poisons nor mole-destroyal attempts with water flooding, digging or other chancy and unsure ways of getting rid of moles. The instant contrivance, which is another objective of this invention, avoids all of those not too sure or easy to work things.

The instant contrivance is particularly attractive because it is very plain and quite good and simple. With it, moles can be killed very effectively for about as cheap and in an uncomplicated a way as possible.

PARTICULARIZED EXEMPLIFICATION OF THE INVENTION

The several views in the accompanying Drawing and the following explanation thereof clearly demonstrate the invention (which has been proven to work very well by actual test).

Figure 2:
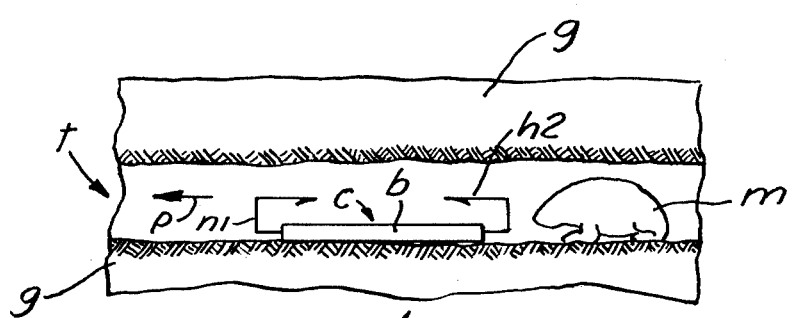
Figure 3:
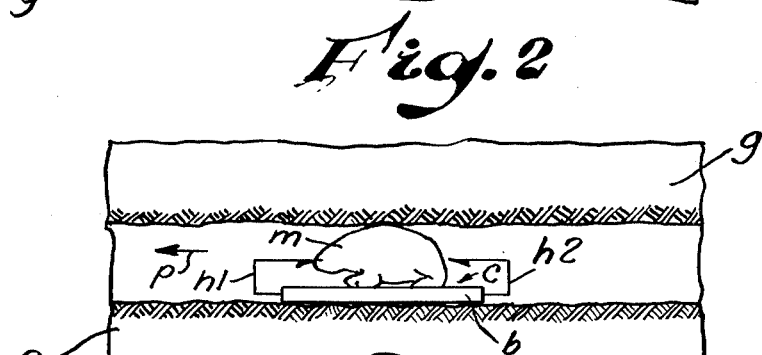
Figure 4:
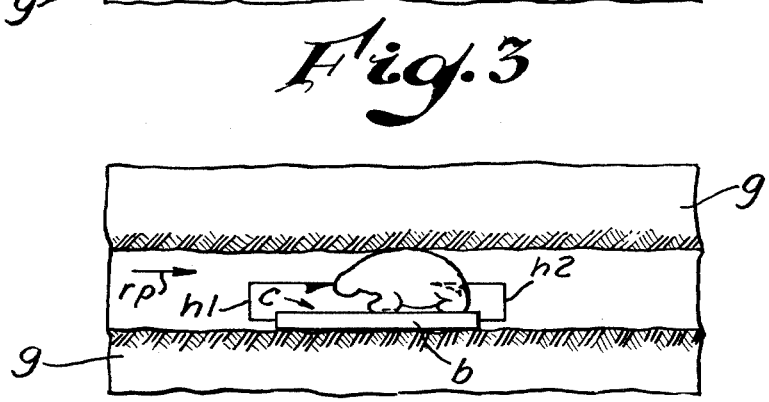

In the Drawing:

FIG. 1 is a perspective view of the mole catcher;

FIG. 2, fancifully and in an underground cut-out side view section, shows the catcher in a mole hole with the varmint approaching it;

FIG. 3, depicted anlogously to FIG. 2, shows the mole making first forward contact where it gets pricked on and startled by the catcher making it move quickly back to try to get away; and FIG. 4, also depicted analogously to FIG. 2, shows the mole backed up and permanently impaled by (and to die in) the catcher.

With initial reference to FIG. 1, the mole catcher is labeled generally with a "c". It has a base "b" with two hooks "h1" and "h2" secured on it. The base "b" can be wood, plastic or metal (wood being advantageous) and is best a rectangle—even though ovals, circles or other shapes can be employed. In any event, depending on what size hooks are used and how they are mounted, the outermost end-to-end distance placed in a line in the direction of the mole trap is usually only about $1\frac{1}{2}$ to 6 inches and more advantageously between $3\frac{1}{2}$ and $4\frac{1}{2}$ inches. But these dimensions can change with hook size and how far they are disposed to allow them to project from the ends of the base in the cases where the hooks are so put on the base as to permit that. And, if it is not desired to use up more base stock, the ends of the base can jut out beyond the outermost ends of the hooks. Base thickness is not critical, just so a good mounting of the hooks is made on the base. Wood bases of $\frac{1}{4}$ to $\frac{3}{8}$ inch or so are usually satisfactory. Width and length can vary, so long as the base is sturdy and steady enough when placed down. Many of the mole catchers according to the invention are only 1 to $1\frac{1}{2}$ or so inches wide and, depending whether or not the hooks jut out past base ends, may be 3 to 6 or so inches long.

It is sometimes optionally desirable to put a relatively long nail down through the base, such as nail "n" shown dotted in FIG. 1. This can be almost anywhere desired on the base. A couple or more nails can be used and, no matter how many, should stick down under the base at least $\frac{1}{4}$ to $\frac{1}{2}$ inch or so with reasonable extra length causing no problem. Staples or screws can also be used in this way. These projections help keep the catcher anchored in place when put down so the mole or other vermin hooked in it can't drag it along and, accordingly, help itself get loose of it. If an anchor is wanted, any kind which depends from the bottom of the base to get pushed in the ground can, of course, be used.

The hooks capable of being employed in embodiments of the present mole catcher are preferably barbed and of the usual U-shaped variety. Nonetheless, such type of hook is not critical to employ, it being usually sufficient if the hook is so shaped as to be capable of being set on the board so that the shank part is in or on the base with the sharp pointed end parts or tips substantially or completely standing upright and aimed toward the center and in a separate line more or less parallel with the base. The benefit of using barbed hooks is apparent. They have a better chance of holding the stuck mole. But a plain hook can also work even though less certain of keeping the pronged mole in the catcher. Ordinary fish hooks, like the No. 2 or so to No. 8 or so size (as are standardly rated) with a No. 4 being a good one to use, work fine and are cheap and able to be gotten almost anywhere.

The hooks can be put on the board or the like in any desired way, although it is important that they be held firm and mounted strong enough to stay in place when the mole runs into them. It is usually advantageous to put the hooks on the base so as to be positioned in a line that goes with the way the mole will travel in the hole. The hooks can be simply pushed into the ends of the base (or pushed and glued as is shown in FIG. 1). Of, if desired, the long unpointed side of the hook can be taped on the top of the bottom of the base or somehow, if preferred, affixed to the base with a good cement. One neat way to fasten ordinary fish hooks is to use small tacks or the like driven into the base through the eye of the hook with staples down along the shank to keep the hook well in place. The staples (or even the eye nails) can be long ones that stick out from the bottom of the catcher to therein provide built in anchors.

Of course, in a more sophisticated manner of construction, plastic can be employed for the base with the hooks therein molded in place during fabrication of the base. The same applies to metal if a metal base is cast, it being possible with metal to make an entire one piece outfit out of cast metal. That, nonetheless, would probably cost more than simpler wood and fish hook jobs.

There's really no complete need for the base to be solid. It can have holes in it or be made in such a manner as to have a center body part with sideways-extending feet. It is merely necessary that the thing can be placed flat and be stable with the hooks sticking out and fixed up above it.

It is beneficial to keep the space between opposed points of hooks "h1" and "h2" (which is illustrated in FIG. 1 as the distance "s") between, for example, 1½ (or 2) or so and 3 (or 4) or so inches. This seems to go well with the size of most moles and permits generally good operation of the catcher. Naturally, if a catcher is used for other underground tunneling animals such as rats, chipmunks and the like animals (as can be done) the hooks ought to be aptly spaced to be effective on the body of the animal being snared.

Operation of catchers according to the invention is illustrated in FIGS. 2, 3, and 4. In those views, the ground is designated "g"; the mole hole or tunnel (using an arrow to point it out) "t"; the mole "m"; with the direction that the mole is going in the catching act shown by the arrows labeled "p" (for path).

To use the catcher and literally needless to mention, a mole burrow must be located. Then the top of the burrow is carefully opened up at a likely busy spot with as little spoiling of the tunnel as possible. The catcher "c" is placed upright in the bottom of the hole. Then the top opening is nicely closed up and gently padded back. It is immaterial if the burrow is filled in over the catcher or not, since even if ground buries the catcher the mole will dig through it to get caught on the contraption. After that, only waiting is involved for mole-kill results which invariably happens without concern or additional effort.

In any event, FIG. 2 shows a mole moving and burrowing along its hole towards the catcher therein disposed. The mole moves along and over the smooth and rounded end of the first hook "h2" on the catcher "c" that it gets to. Then, pushing on, as shown in FIG. 2, the mole runs into and generally gets stuck by the second (or far as compared to the vermin's runway direction) hook "h1". Usually, the mole is firmly affixed in that hooking, (especially if barbed hooks are in the catcher device). But, whether or not this initially happens and whether or not hook "h1" holds securely in the face or body or leg part of the travelling mole, the jabbing from initial hook contact shocks and startles the mole and makes it quickly move or jump backward (as shown in FIG. 3 with arrow "rp" giving the backward, usually fast move of the startled animal trying to escape from hook "h1"). In doing this, the catcher "c" then almost certainly captures the mole by impaling and hooking it at or near its hind end or quarters on hook "h2". Sometimes, even if the vermin gets off the second hook, (which is the first one it runs into and it gets snagged with) in its movement going backward to get off that hook to then push into the behind hook, it will still get caught again on the second hook "h1" by jumping or moving forward again when snagged with the behind hook "h2". Whatever occurs, all this action surely and permanently snares and traps the mole, keeping it on the catcher without being able to get away. This is almost always so whether or not hook "h1" keeps into and also holds the stuck animal. The anchor option sometimes helps achieve more sure snaggings.

After the impalement, the mole, despite its wiggling and squirming, sooner or later dies affixed on the catcher from starvation or injury or both. It then simply and without any problem rots in the ground and vanishes (which, coincidentally, puts a trace of organic fertilizer in the premises). With the mole gone, the burrow can be just flattened out by rolling or tromping down the surface ridge getting rid of the unsightly mole work. If desired, the catcher can be dug up after use; cleaned; and reused. But being so inexpensive, it is usually economically insignificant if a used catcher is simply left in the ground.

Catchers according to the present invention have been generously tested yielding good and satisfying results. They quickly and practically permanently get rid of the moles in most places for the involved season.

For most pleasing season-long results it is desirable to use the presently contemplated contrivance in the springtime when moles seem to be most active so that mole damage the rest of the year is minimized. Nonetheless, the catcher works any time that the moles are active.

The present catcher can be altered in many ways without departing from the present invention as hereinafter more particularly claimed.

And, even though the invention is herein most frequently characterized as being a mole catcher, it is also (as mentioned) useful for catching chipmunks and rats. The contrivance can thus be used for other underground digging critters besides moles, rats and chipmunks, such as mice, shrews and so forth.

What is claimed is:

1. As an article of manufacture, a device for catching moles and other vermin comprising:
   (a) a generally rectangular and flat base;
   (b) a pair of hooks secured on said base, each of said pair of hooks of hooks (b) being generally of the fish hook-sort; with each accordingly having
   (c) a non-cutting shank portion; and
   (d) a bent over-and-back hook portion extension of said shank portion (c) that is free from lateral cutting edges, with said hook portion terminating in and with
   (e) a sharp-pointed and barbed tip at the free end of said hook portion (d), with
     said hooks (b) thus being further generally characterized in being entirely free of any running edge surface(s) thereupon that are capable of cutting and slicing save for the pointed sharp end of said barbed tip portion (e) of each,
     said pair of hooks (b) being respectively individually and separately fixed flatly one at each end of said base (a) with and by their respective shank portions (c) towards and on the respectively opposite narrow ends of the base (a);
     each of said pair of hooks (b) being disposed on the base (a) with the hook portions (d) thereof raised upwardly over the base (a) and with their respective tips (e) opposed to and pointed towards one another and coincident therewith; so that each of said hook tips (e) in said pair of hooks (b) extends outwardly from respective longitudinal ends of said base (a) so as to be postured with hook portion(s) (d) going up-and-over the end edge(s) of the base (a) then back-over the top of said base with non-cutting shank and non-cutting and -slicing curled-over hook portion(s) (d) exposed in elevation over said base; with each of said barbed hook tips (e) also being respectively and individually pointed towards the central part of said base (a), in which direction the shank portions (c) of the pair of hooks (b) are set upon the base (a) in a line that is at least approximately parallel with the longitudinal center line of said base (a) while standing upright with respect to said base; with only said sharp-pointed barbed tips (e) of each of said pair of hooks (b) being capable of impaling and in any way cutting for catching objects moving thereon and thereagainst when said objects move in a path of travel coincident with the end-to-end longitudinal center line of said base (a) and in said path against the direction in which either of said barbed tips (e) are pointed:

said pair of hooks being so fixed on the base (a) that the hooking tips (e) of each of said pair of hooks (b) are so positioned and disposed that the tip-to-tip spacing between said oppositely-pointing pair of hooks (b) is between about 1½ and about 6 inches and, in any given instance, on an order of spacing that is at least approximately half the length of said base (a); plus (f) spike means adapted to anchor said device in and with ground when it is placed for use, said spike means (f) being nail-like appendages protruding downwardly from and fixed to said base (a).

* * * * *